US012172597B2

(12) United States Patent
McDonald et al.

(10) Patent No.: US 12,172,597 B2
(45) Date of Patent: Dec. 24, 2024

(54) PEDESTRIAN PROTECTION AUTOMOTIVE HINGE

(71) Applicant: MULTIMATIC INC., Markham (CA)

(72) Inventors: George McDonald, Hethersett (GB); Chester Curtis, Norwich (GB); Steven Avermate, Oudsbergen (BE)

(73) Assignee: MULTIMATIC INC., Markham (CA)

( * ) Notice: Subject to any disclaimer, the term of this patent is extended or adjusted under 35 U.S.C. 154(b) by 0 days.

(21) Appl. No.: 18/561,122

(22) PCT Filed: May 25, 2022

(86) PCT No.: PCT/IB2022/054884
§ 371 (c)(1),
(2) Date: Nov. 15, 2023

(87) PCT Pub. No.: WO2022/249083
PCT Pub. Date: Dec. 1, 2022

(65) Prior Publication Data
US 2024/0253591 A1     Aug. 1, 2024

(30) Foreign Application Priority Data

May 25, 2021   (DE) .................... 10 2021 205 306.8

(51) Int. Cl.
*B60R 21/38*   (2011.01)
*E05D 11/10*   (2006.01)
*E05F 15/75*   (2015.01)
(52) U.S. Cl.
CPC .......... *B60R 21/38* (2013.01); *E05D 11/1014* (2013.01); *E05F 15/75* (2015.01); *E05Y 2201/624* (2013.01); *E05Y 2900/536* (2013.01)
(58) Field of Classification Search
CPC ... B60R 21/38; B60R 2021/343; B60R 21/34; E05Y 2900/536; E05D 11/1014
(Continued)

(56) References Cited

U.S. PATENT DOCUMENTS

| 7,506,716 B1 | 3/2009 | Salmon et al. |
| 8,939,249 B2 * | 1/2015 | Kuhr ....................... B60R 21/38 |
| | | 180/274 |

(Continued)

FOREIGN PATENT DOCUMENTS

| CN | 102444348 A | 5/2012 |
| DE | 102008046145 A1 | 3/2010 |

(Continued)

OTHER PUBLICATIONS

PCT International Search Report and Written Opinion, PCT/IB2022/054884, Sep. 20, 2022, 16 pages.
(Continued)

*Primary Examiner* — Paul N Dickson
*Assistant Examiner* — Caitlin Anne Miller
(74) *Attorney, Agent, or Firm* — QUARLES & BRADY LLP

(57) ABSTRACT

A pedestrian protection automotive hood hinge comprises a release assembly which comprises a retainer supported by one of a first member and a second member and a releasable pin supported by the other of the one of the first and second members. The releasable pin is captured in the retainer in the normally closed position and the normally opened position. An actuator is configured to engage the second member and move the second member upward relative to the first member in response to a collision input. The releasable pin is configured to be released by the retainer in response to the collision input permitting the second member to pivot about a member pin relative to the first member to an opened hood collision position. A retention link with a retention pin moves in a controlled manner during a collision so that the retention pin engages a retention slot. At maximum opening of the hood, the retention pin engages a retention clip adjacent the retention slot and begins to rebound. With (Continued)

continued force exerted by the hood on the retention clip, the retention pin passes through and exits the retention clip and the hood decelerates to a final post collision position.

14 Claims, 15 Drawing Sheets

(58) Field of Classification Search
USPC .......................................................... 180/274
See application file for complete search history.

(56) References Cited

U.S. PATENT DOCUMENTS

| | | | | |
|---|---|---|---|---|
| 9,637,082 | B2* | 5/2017 | Ferri | B62D 25/10 |
| 9,701,277 | B2* | 7/2017 | McIntyre | B60R 21/38 |
| 9,863,170 | B2* | 1/2018 | Park | E05B 77/08 |
| 11,168,498 | B2* | 11/2021 | Distefano | E05B 85/243 |
| 11,230,255 | B2* | 1/2022 | Sasaki | E05B 77/08 |
| 11,318,909 | B2* | 5/2022 | Szente | B62D 25/12 |
| 11,719,025 | B2* | 8/2023 | Sasaki | E05B 83/24 |
| | | | | 292/114 |
| 2009/0289473 | A1* | 11/2009 | Kmieciak | B60R 21/38 |
| | | | | 296/193.11 |
| 2013/0074284 | A1 | 3/2013 | Kuhr et al. | |
| 2013/0227818 | A1* | 9/2013 | Zippert | B60R 21/38 |
| | | | | 16/366 |
| 2023/0356688 | A1* | 11/2023 | Sardelli | B60R 5/02 |

FOREIGN PATENT DOCUMENTS

| | | |
|---|---|---|
| DE | 102009040415 A1 | 3/2011 |
| DE | 102017130621 A1 | 5/2021 |
| EP | 2634047 A1 | 9/2013 |
| WO | 2017003641 A1 | 1/2017 |

OTHER PUBLICATIONS

PCT International Preliminary Report on Patentability, PCT/IB2022/054884, Jul. 27, 2023, 7 pages.

* cited by examiner

PEDESTRIAN PROTECTION AUTOMOTIVE HINGE

CROSS REFERENCE TO RELATED APPLICATIONS

This application represents the United States national stage entry of PCT International Application PCT/IB2022/054884 filed on May 25, 2022, and published under Publication No. WO 2022/249083 A1 on Dec. 1, 2022, which International Application claims the benefit of priority from German Patent Application No. 10 2021 205 306.8 filed May 25, 2021, both of which are incorporated herein by reference in their entirety for all purposes.

BACKGROUND

This disclosure relates to a pedestrian protection automotive hinge.

In recent years, the automotive industry has expanded its adoption of pedestrian protection features on automobiles. One such feature is to make the front of the vehicle, in particular the hood, more compliant during a frontal impact with a pedestrian.

One approach for absorbing a pedestrian impact with the hood is to deploy actuators associated with the hood hinges to raise the hood slightly, creating a crumple zone between the hood and the engine compartment. Typically pyrotechnical actuators common with other vehicle safety systems such as seat belt pre-tensioners are used.

Since the hinges need to maintain their normal function, the hinges incorporate a release assembly, which retains a desired structural relationship between the hinge's components during a normal hinge operating state, but selectively enables certain elements of the hinge to move relative to one another when the actuators are deployed. Once the hood is raised slightly during a pedestrian impact event, the hood must be held ajar since the pyrotechnical actuators release pressure after actuation (for safety reasons) and are unable to maintain the hood in this slightly opened position.

Another approach, in vehicles with smaller displacement engines, leaves the hood closed during a pedestrian impact event. A sufficient crumple zone between the closed hood and the small engine permits the hood to collapse into the engine compartment without the need of an actuator during a pedestrian impact.

A number of pedestrian protection hinge systems have been proposed in the prior art. US 2013/0074284 to Kuhr et al. describes a hood hinge which comprises a body hinge member and a hood hinge member which are joined at a pivotable connection. The hood hinge member is connected to a bracket at a shear pin and at a pivot pin located adjacent the distal end of the hood hinge member and a first end of the bracket. The bracket is connected at a first (horizontal) wall to the hood. The shear pin prevents relative movement between the hood hinge member and the bracket during normal hood opening and closing. Thus, in normal operation, the hood hinge permits the hood to open from the front as the hood hinge member pivots relative to the body hinge member around the pivotable connection. An upstop pin fixed to the hood hinge member sits within a slot in a second (vertical) wall of the bracket. During normal operation, the upstop pin plays no role in the hinge movement since the shear pin prevents relative movement between the hood hinge member and the bracket. The upstop pin is in contact with a detent of a flexible latch member which is fastened by a fastener to a first (horizontal) wall of the bracket. When a pedestrian collision occurs at the front end of the vehicle, a signal is sent through the electrical conductor to the actuator. The actuator forces the first wall of the bracket upward causing the shear pin to shear off. This permits the bracket to rotate about the pivot pin relative to the hood hinge member thus raising the rear of the hood relative to the front of the hood. After shearing of the shear pin, the upstop pin fastened to the hood hinge member is forced out of the detent in the flexible latch member and moves downwardly to the lower limit of the slot in the second wall of the bracket. The pressure exerted by the latch member against the upstop pin decreases significantly after the upstop pin leaves the detent. Although the free end of the latch member remains in contact with the upstop pin, it exerts minimal force. Thus, the action of the upstop pin against the latch member does not provide any controlled deceleration of the system as it reaches its maximum point of travel. The upstop pin essentially crashes into the lower end of the slot to end the travel of the hood. This may result in violent "hood flutter" and increased pedestrian contact acceleration as the system reaches its end stop during the pedestrian impact event. Following the collision, when it is desired to move the hood back into a more normal position to permit the driver to better see frontward through the windshield, hand pressure downwardly on the hood allows the upstop pin to move upwards in the slot, back along the profile of the latch member, and into the detent. The latch member does not appear to provide any locking or to significantly hold apart the bracket and the hood hinge member when the hood is in the deployed position following a pedestrian collision.

DE 10 2008 046145 to Koestler et al. describes two pedestrian protection devices, one passive (FIGS. 1 to 3) and one active (FIGS. 8 and 9). In each case, there are first and second linkages spaced apart from one another. In the passive mode, the spacing between the linkages may change by allowing the pivot point to move laterally. In the active mode, the pivot points remain constant. The linkages are not interconnected with first and second hinge portions (i.e. a first hinge portion and the first member of a second hinge portion). Although the upper pivot points are connected to a hinge part, which is in turn connected directly or indirectly to the hood, the lower pivot points are connected to the body of the vehicle. Thus, although the linkages of Koestler are involved during a pedestrian collision, they are not connected to two hinge portions.

EP 2634047 to Zippert et al. discloses a pin which is not restrained by a hook, but rather may be released from one end of a slot forming the hook. There is no frangible clip holding the pin in the hook. Rather, a separate shear screw (engaging means) is designed to shear during a collision. There are no first and second linkages pivotally interconnected to a first hinge portion and a first member.

WO 2017/003641 to Patterson discloses a pedestrian protection automotive hinge which includes a release assembly which includes a clip supported at one of the first and second ends and a stop pin supported by the other one of first and second members. The stop pin is captured in the clip in the normally closed position and the normally opened position. The stop pin is configured to break the clip in response to a collision input permitting the second member to pivot about a member pin relative to the first member to an opened hood collision position and the stop pin to move to a second end of a slot. An actuator is configured to engage the second member and move the second member upward relative to the first member in response to the collision input and break the clip. The stop pin remains restrained in the slot to limit extension of the first and second members. In addition, a hold system comprising a separate ramp may be used to rapidly decelerate the hood during the course of its deployment.

Accordingly, it would be advantageous to have a pedestrian protection hood hinge with the functionality of Patterson while separating the release assembly from the holding assembly and providing a holding assembly also capable of allowing the hinge mechanism to collapse in the case of a pedestrian impact exceeding a certain impact load.

SUMMARY

According to a first aspect, a pedestrian protection automotive hinge is provided that comprises a first hinge portion, a second hinge portion which comprises first and second members secured to one another by a member pin, and wherein one of the first and second members has an opening adapted to releasably retain a releasable pin, first and second linkages spaced apart from one another and each pivotally interconnected to the first hinge portion and the first member, the first and second linkages configured to permit movement of the first and second hinge portions relative to one another between a normal closed hood position and a normal opened hood position, an actuator system comprising an actuator configured to engage the second member and move the second member in relation to the first member in response to a collision input, a release assembly comprising a retainer located adjacent the opening, wherein the releasable pin is supported by the other of the one of the first and second members and the releasable pin is captured in the opening by the retainer in the normally closed position and the normally opened position, and wherein the retainer is configured to release the releasable pin in response to the collision input permitting the second member to pivot about the member pin relative to the first member, a retention link rotatably mounted at a first end to the second member and comprising a retention pin adjacent its second end and a locating pin between the first end and the second end, the locating pin configured to ride in a curved slot in the first member to change the orientation of the retention link in relation to the second member as the second member pivots about the member pin relative to the first member, the first hinge portion comprising a retention slot and a flexible retention clip mounted therewith, the retention clip comprising an open portion adjoining an open-ended narrow channel, the retention pin configured to register with the retention slot and to bias the retention clip sufficiently to permit a portion of the retention pin to enter the open portion of the retention clip and thereby to reverse the biasing of the retention clip to permit the retention clip to again rest adjacent the retention slot whereby motion of the retention pin is restrained by the retention clip.

In a further embodiment of the pedestrian protection automotive hinge, the retention clip is further configured to permit the retention pin to enter the open ended narrow channel when further force is applied by the retention pin against increasing resistance of the retention clip to permit movement of the first and second members relative to one another to a final end-of-collision hood position.

In a further embodiment of the pedestrian protection automotive hinge, the retainer comprises one of a breakable clip and a latch.

According to a further embodiment, the retention slot is tapered.

According to a second aspect, a method of deploying a pedestrian protection automotive hinge is provided. The method comprises the following steps: providing a hinge comprising a first hinge portion and a second hinge portion which comprises a first member and a second member secured to one another by a member pin, and wherein the first member or the second member has an opening adapted to releasably retain a releasable pin, wherein a first linkage and a second linkage, spaced apart from one another are each pivotally interconnected to the first hinge portion and the first member and the first and second linkages are configured to permit movement of the first and second hinge portions relative to one another between a normal closed hood position and a normal opened hood position, activating an actuator in response to a collision input to engage the second member and move the second member in relation to the first member, releasing a releasable pin from a retainer of a release assembly and from the opening in response to the collision input to permit the second member to pivot about the member pin relative to the first member, moving a locating pin located between the first end and the second end of a retention link in a curved slot in the first member to change the orientation of the retention link rotatably mounted at a first end to the second member as the second member pivots about the member pin relative to the first member; registering the retention pin with a retention slot; biasing a retention clip sufficiently to permit a portion of the retention pin to enter an open portion of the retention clip, and resisting motion of the retention pin via the retention clip.

According to an embodiment, the method further comprises the step of permitting the retention pin to enter an open ended narrow channel in the retention clip when further force is applied by the retention pin against resistance of the retention clip until the retention pin exits the open end of the narrow channel to permit movement of the first member and the second member relative to one another to a final end-of-collision hood position.

According to a further aspect, a method of deploying a pedestrian protection automotive hinge is provided. The method comprises the following steps: activating an actuator in response to a collision input to drive a vehicle hood upward, releasing a releasable pin from a retainer in response to the actuator to allow a second member to pivot relative to a first member about a member pin, engaging a retention pin in a retention slot to restrain motion of the second member, and restraining the vehicle hood from further deflection in an opened hood collision position pending contact with a head of a pedestrian.

According to an embodiment, the method comprises a step of engaging the second member with the actuator to initiate the releasing step.

According to a further embodiment, the method further comprises a step of releasing the releasable pin using one of a breakable clip and a latch.

According to a further embodiment, the method further comprises a step of providing the retention slot that is tapered to assist in deceleration of a vehicle hood.

According to a further aspect, a method of deploying a pedestrian protection automotive hinge is provided. The method comprises the following steps: activating an actuator in response to a collision input to drive a vehicle hood upward; engaging a retention pin in a retention slot while pivoting a second member relative to a first member about a member pin; and allowing the vehicle hood to rebound to a final opened hood collision position by engaging the retention pin in a retention clip and translating the retention pin through and out of the retention clip.

According to a further aspect, a vehicle that comprises a pedestrian protection automotive hinge is provided.

According to an embodiment, the vehicle further comprises a sensor that is configured to detect information indicative of a pedestrian collision and/or communicate this information via a controller to the actuator of the actuator assembly of the pedestrian protection automotive hinge. The sensor may be connected to a controller that is further connected to the actuator of the pedestrian protection automotive hinge.

According to a further aspect, the use of a pedestrian protection automotive hinge in a vehicle is provided.

According to a further aspect, the use of a pedestrian protection automotive hinge is provided for absorbing a pedestrian impact and providing pedestrian protection during a pedestrian collision of a vehicle.

These and other aspects will be apparent from and elucidated with reference to the embodiments as per the drawings described hereinafter.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
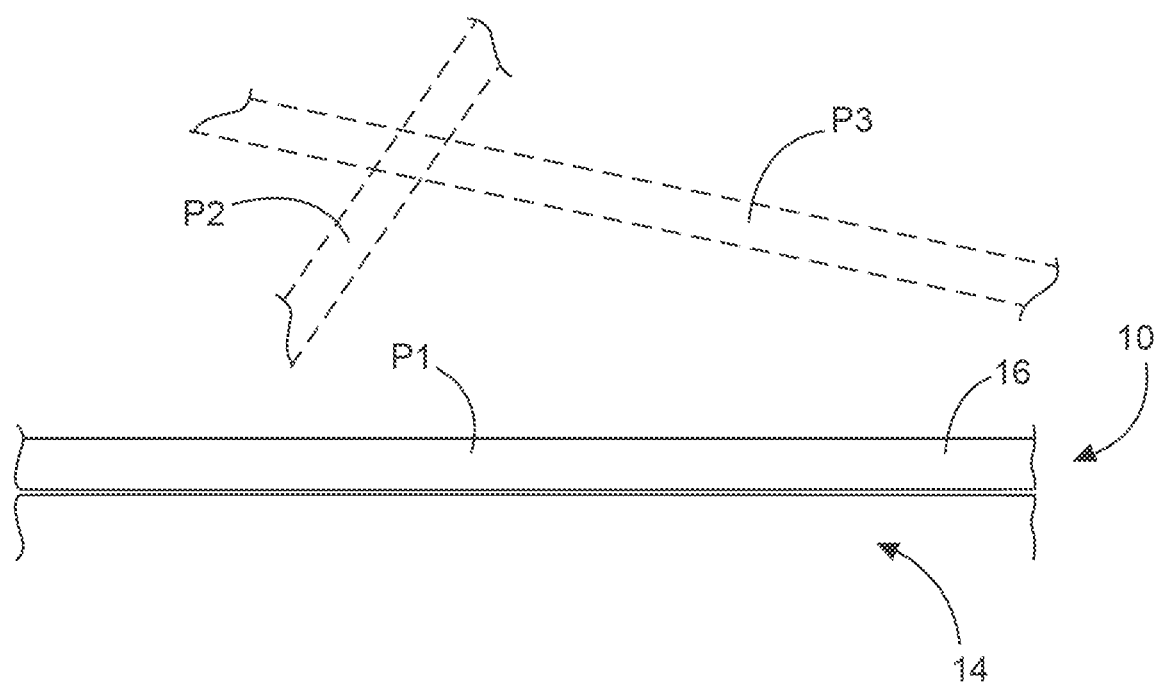
FIG. 1 is a schematic side view showing orientations of an automotive hood in normal closed, normal open and collision deployed conditions.

A portion of a vehicle 10 is illustrated in FIG. 1. The vehicle 10 includes a hood 16 supported relative to a body 14, which is a sidewall of an engine compartment, by a hinge 12. The hood 16 is closed with respect to the body 14 in a position P1 to provide a normal closed hood position. The hood 16 is opened during a normal hinge operating state of the hinge 12 to a fully opened position P2 corresponding to a normal opened hood position to provide access to the engine compartment for maintenance.

During a pedestrian collision event, the hood 16 is partially raised to a position P3 corresponding to an opened hood collision position to better absorb the impact of the pedestrian and enhance pedestrian protection.

Figure 2:
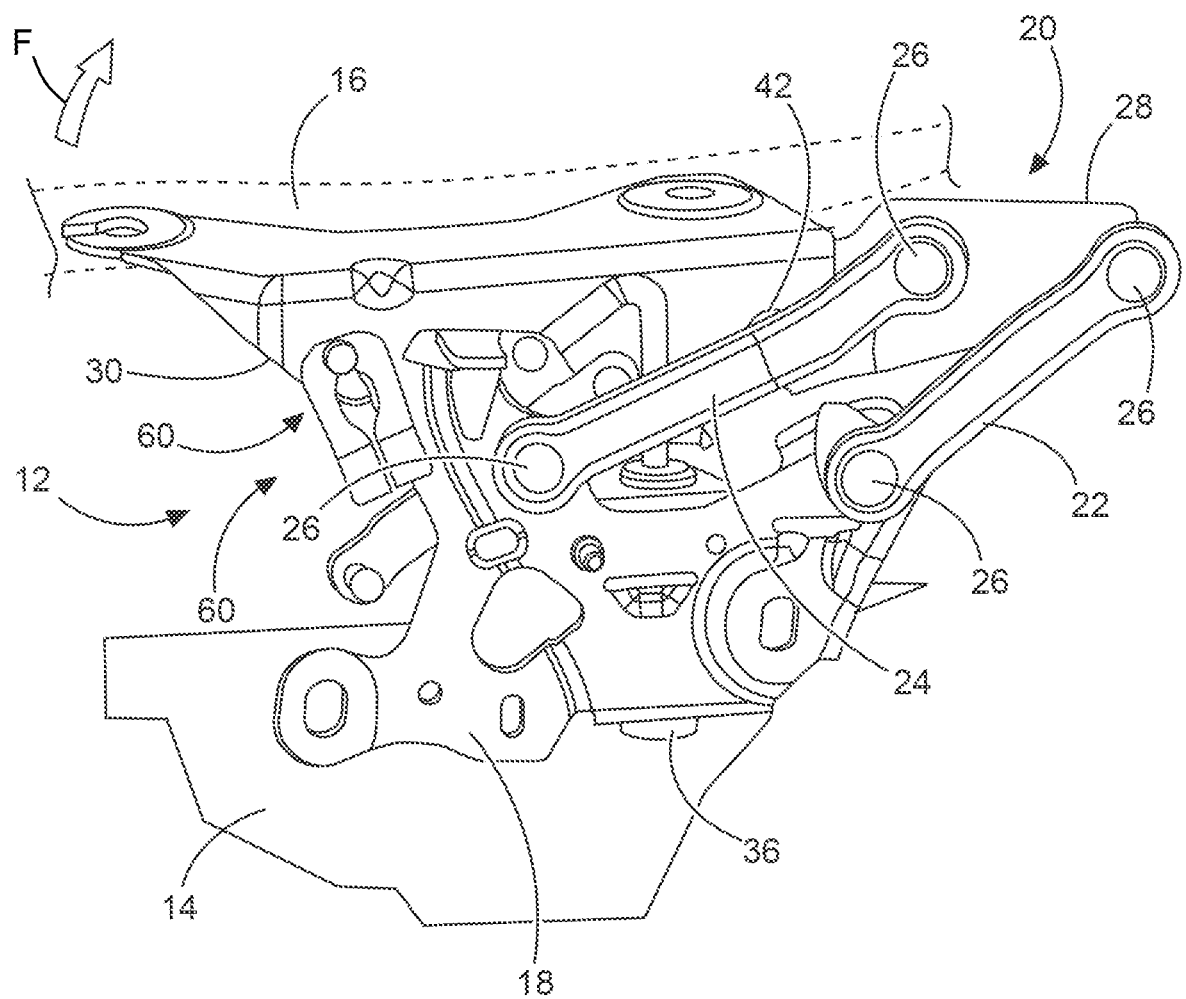
FIG. 2 is a perspective view of an example pedestrian protection automotive hinge in a configuration in which the hood is in a normal closed position.
Figure 3:
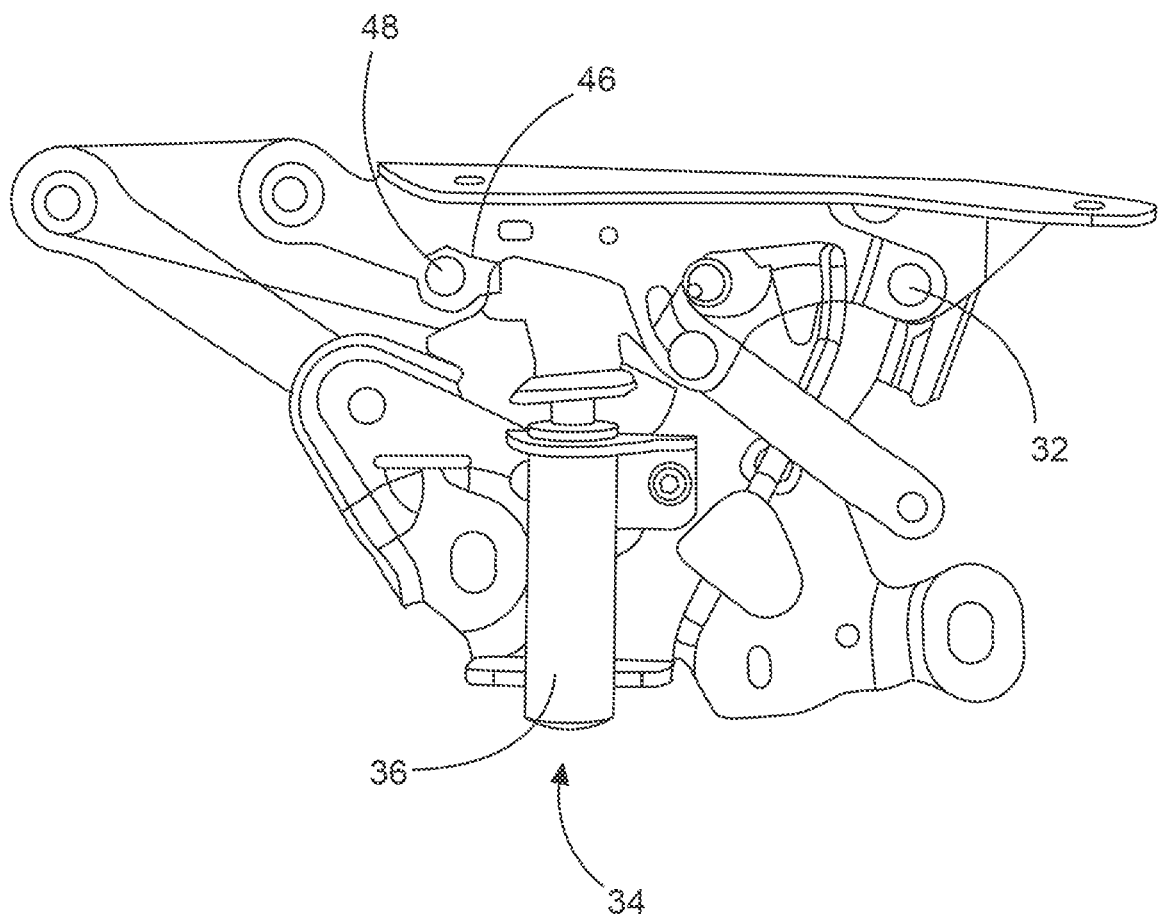
FIG. 3 is a perspective view of the hinge shown in FIG. 2 from an opposite side.
Figure 4:
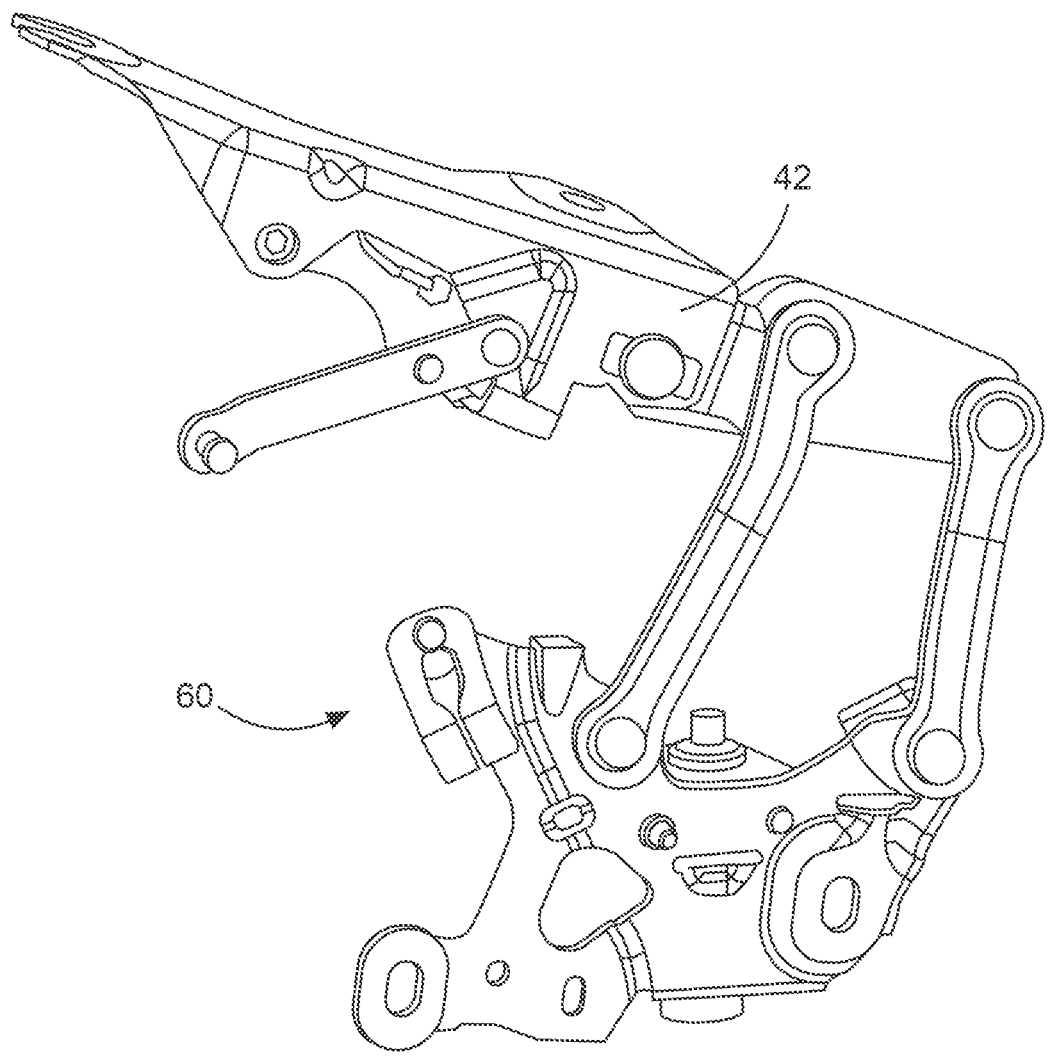
FIG. 4 is a perspective view of portions of the hinge shown in FIG. 2, but in a position corresponding to the hood in a normal opened position.
Figure 5:
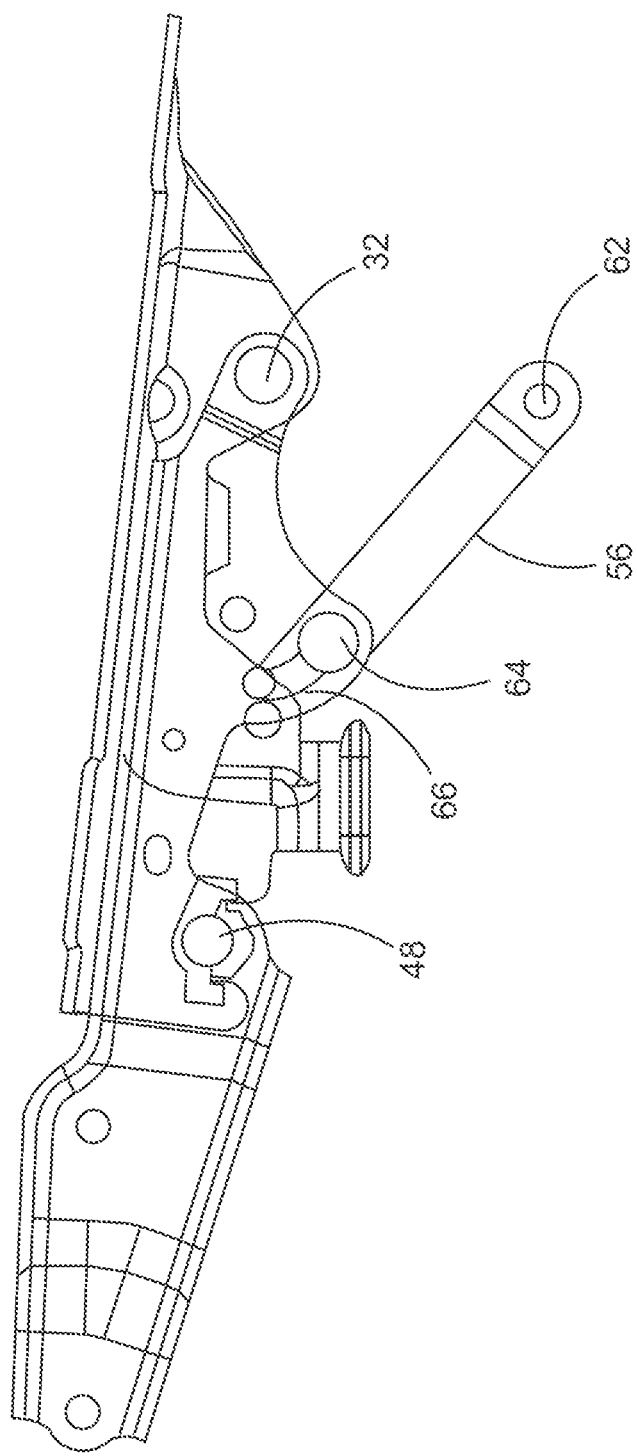
FIG. 5 is a side view of portions of the hinge of FIG. 4 from an opposite side.
Figure 6:
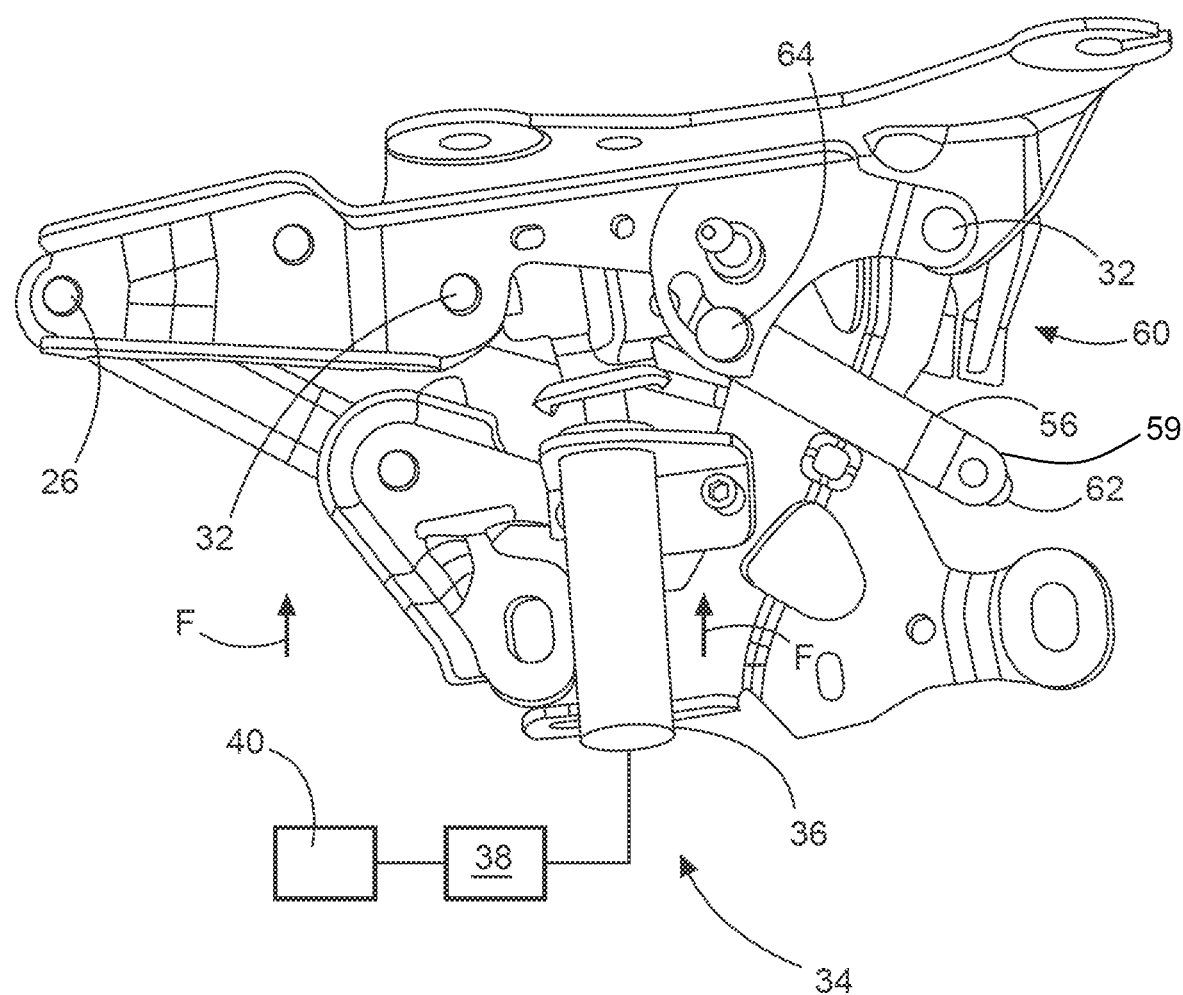
FIG. 6 is a perspective view of an opposite side of the hinge of FIG. 2 in an initial hood collision position.
Figure 7:
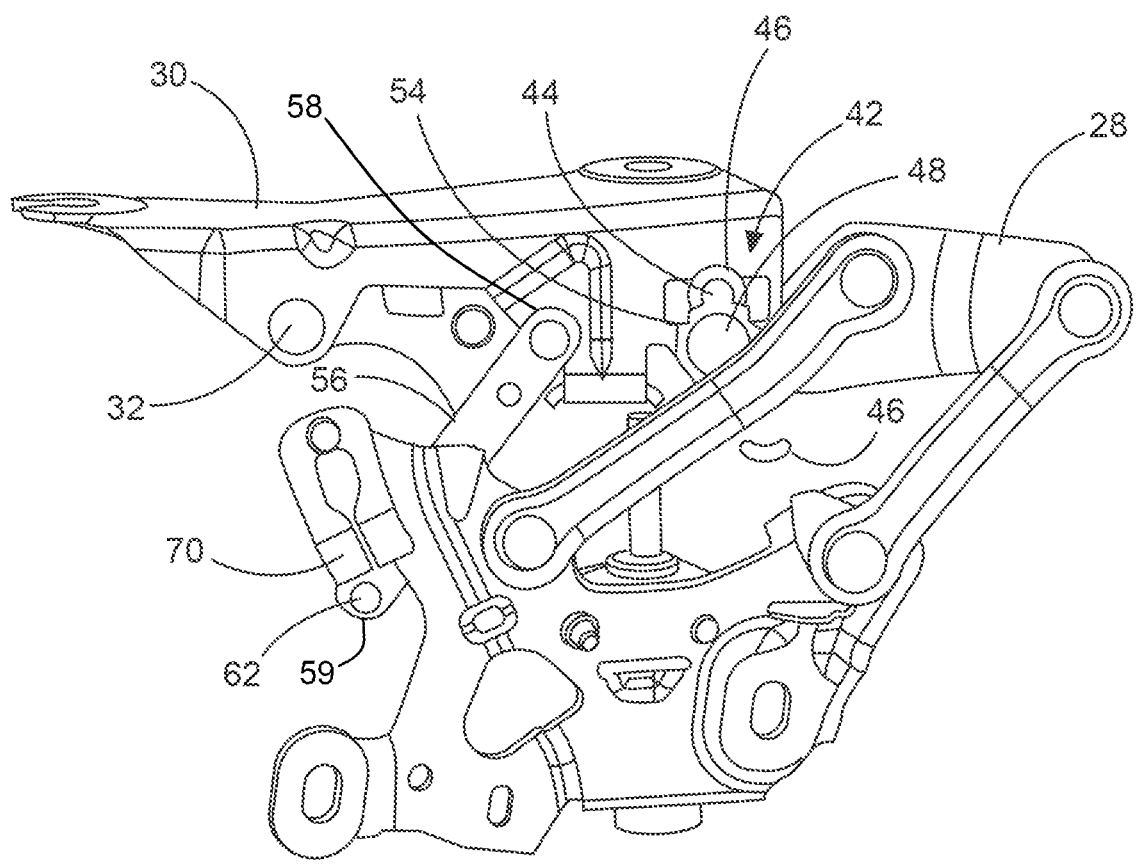
FIG. 7 is a perspective view of the hinge of FIG. 2 in a first intermediate hood collision position.
Figure 8:
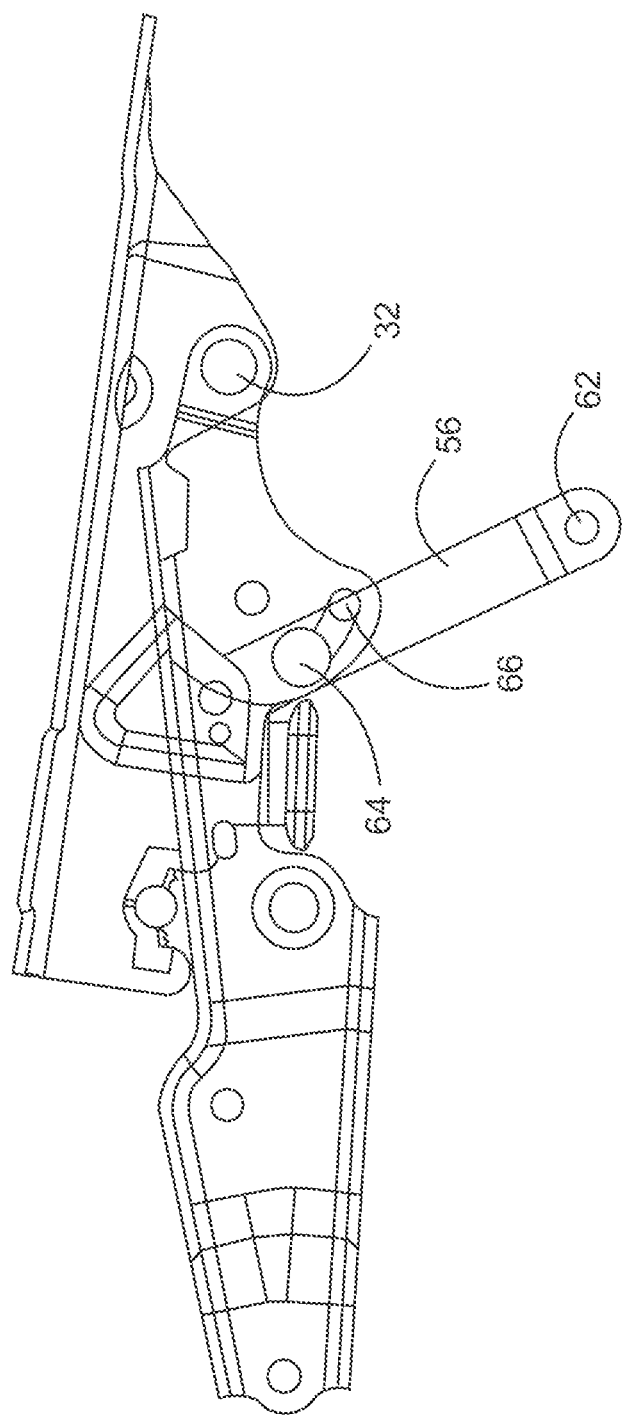
FIG. 8 is a perspective view of portions of the hinge of FIG. 7 from an opposite side.
Figure 9:
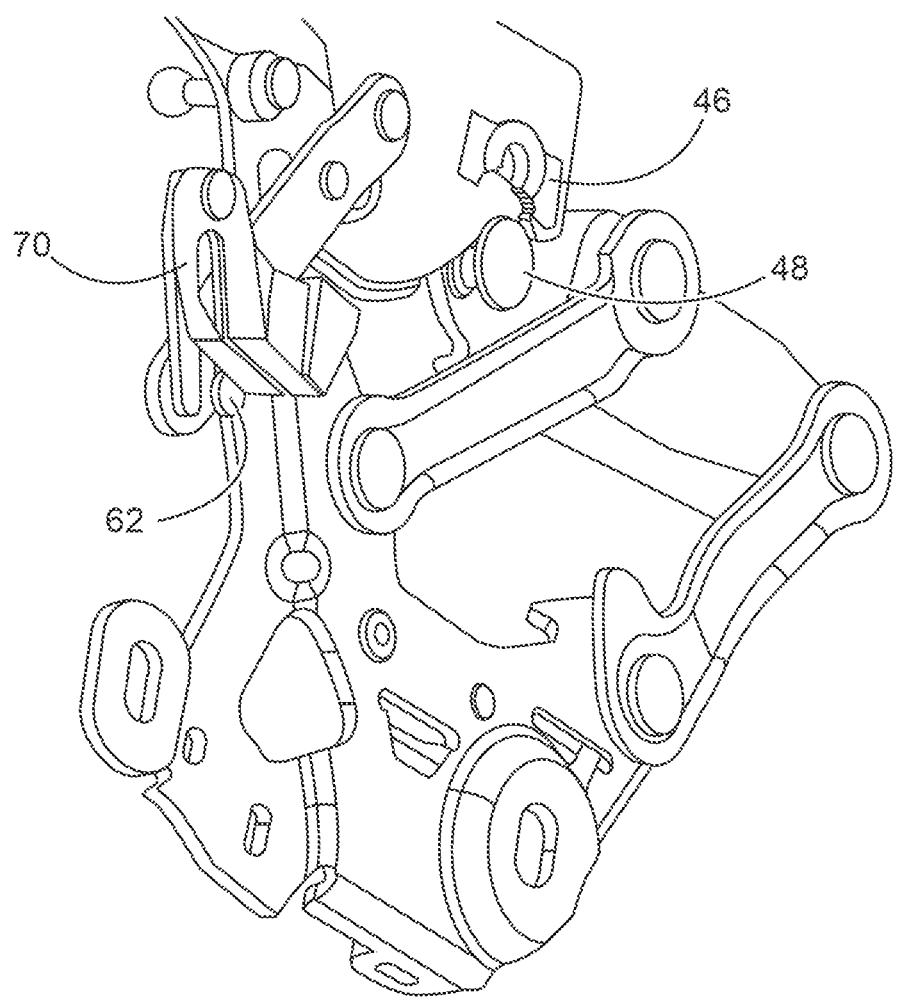
FIG. 9 is a perspective view of portions of the hinge of FIG. 2 in a second intermediate hood collision position.
Figure 10:
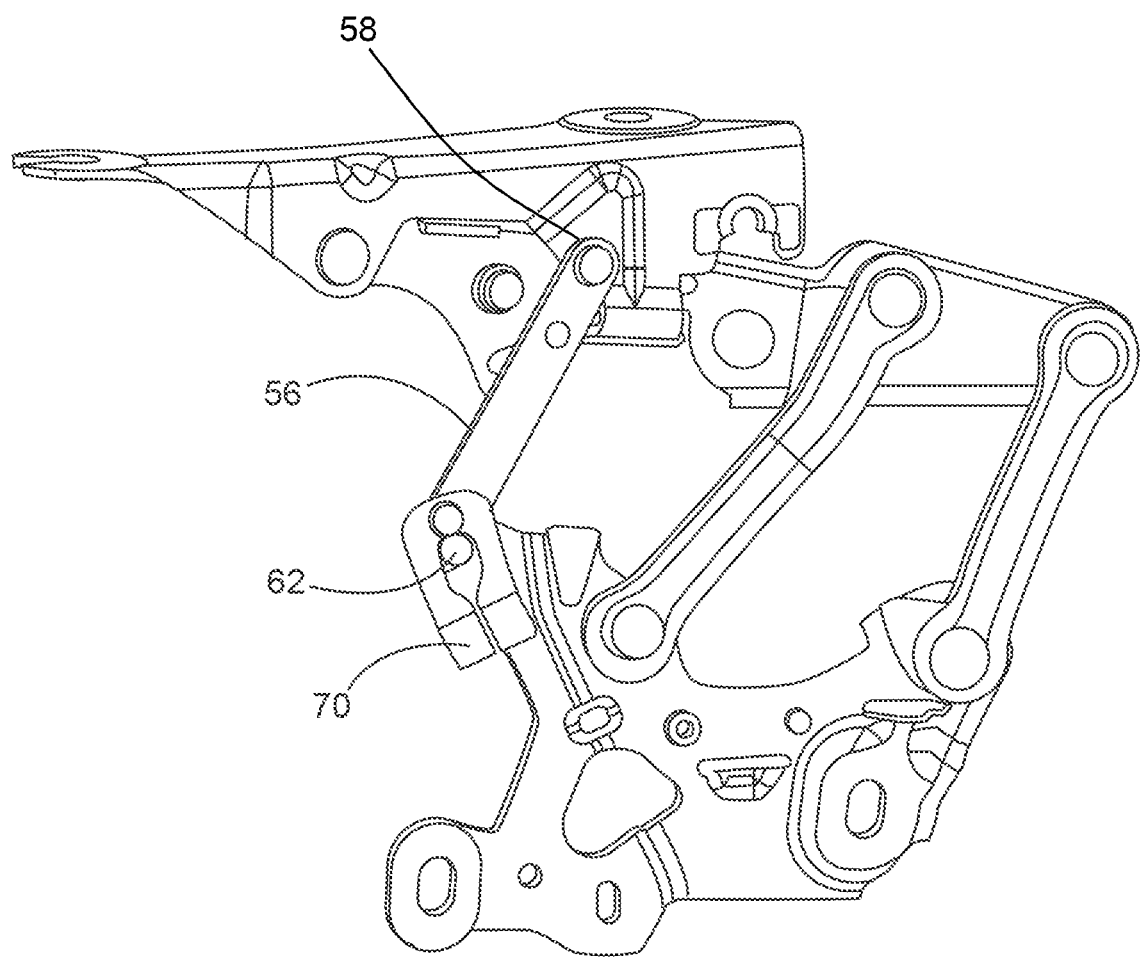
FIG. 10 is a perspective view of the hinge of FIG. 2 in a third intermediate hood collision position.
Figure 11:
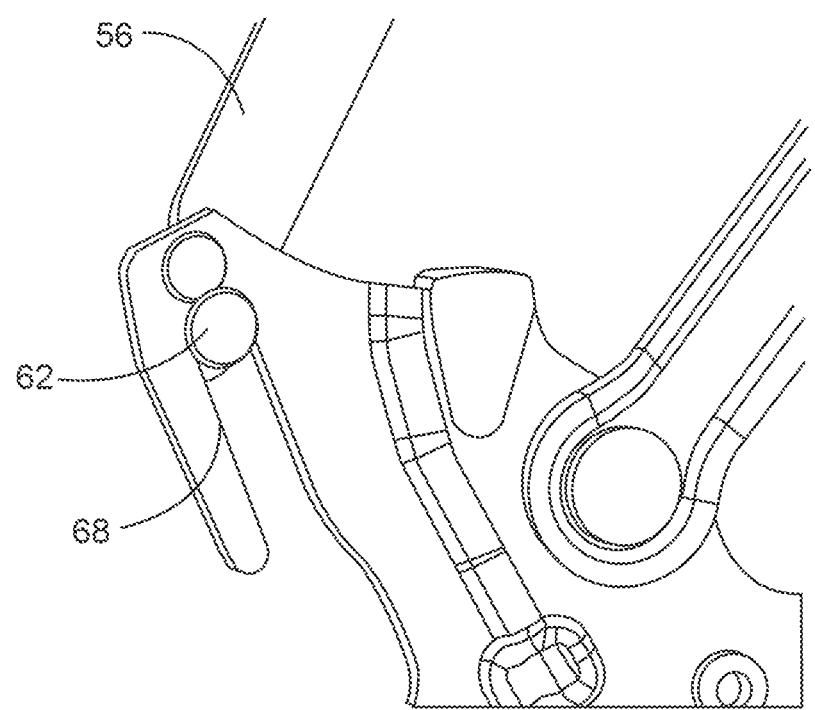
FIG. 11 is a perspective view of portions of the hinge of FIG. 10.
Figure 12:
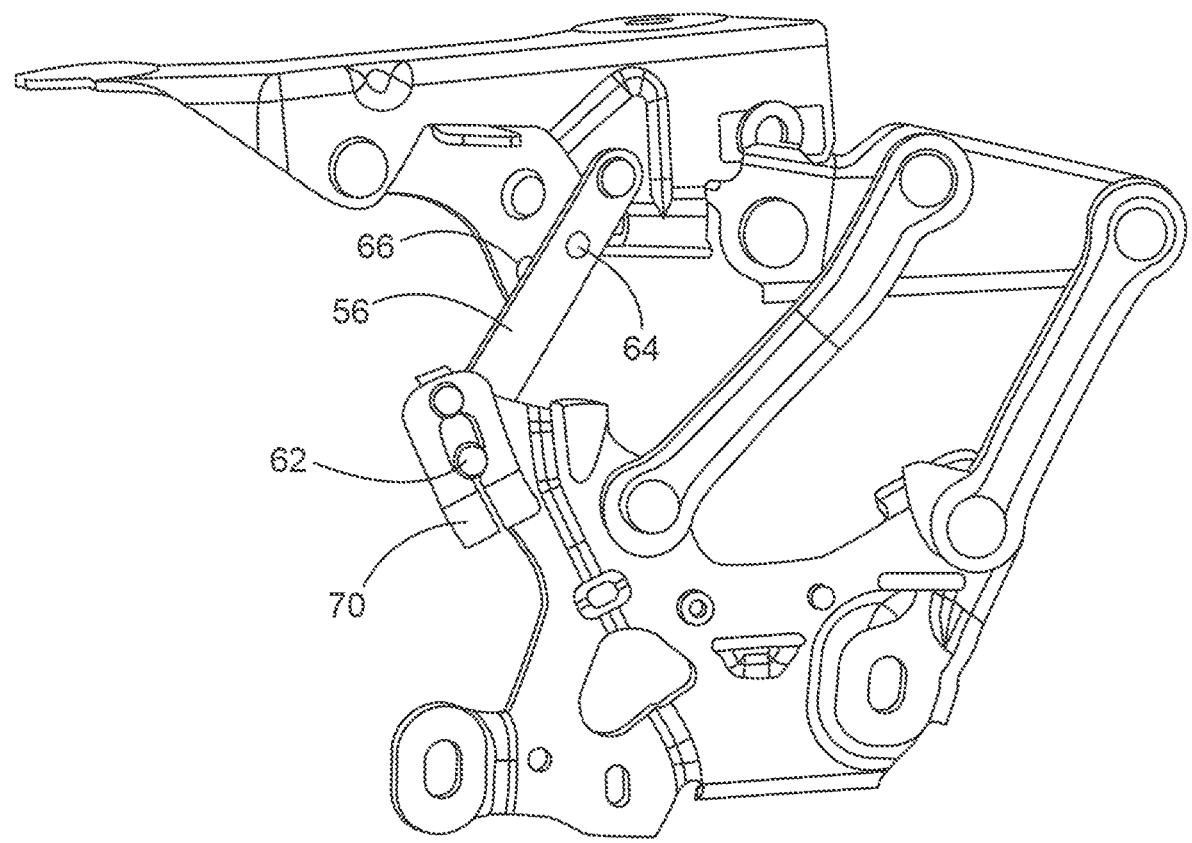
FIG. 12 is a perspective view of the hinge of FIG. 2 in a fourth intermediate hood collision position.
Figure 13:
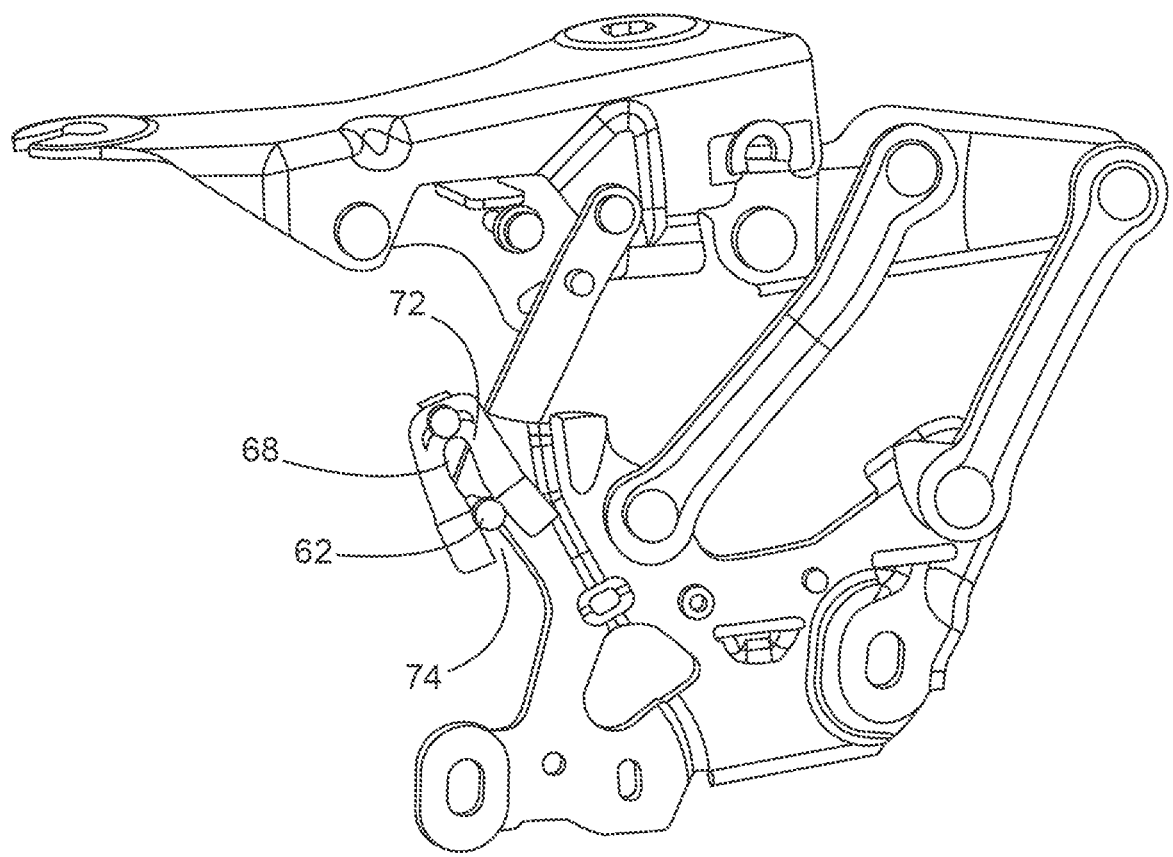
FIG. 13 is a perspective view of the hinge of FIG. 12 slightly later in its fourth intermediate hood collision position.
Figure 14:
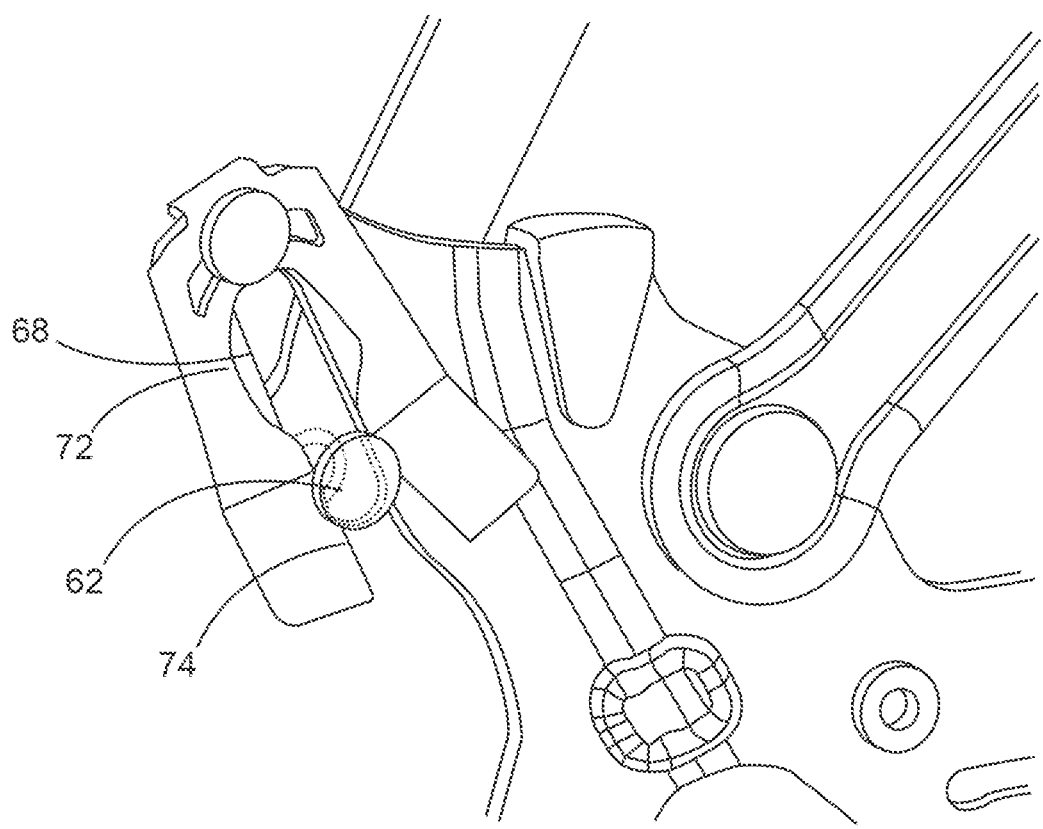
FIG. 14 is a perspective view of a portion of the hinge of FIG. 13.
Figure 15:
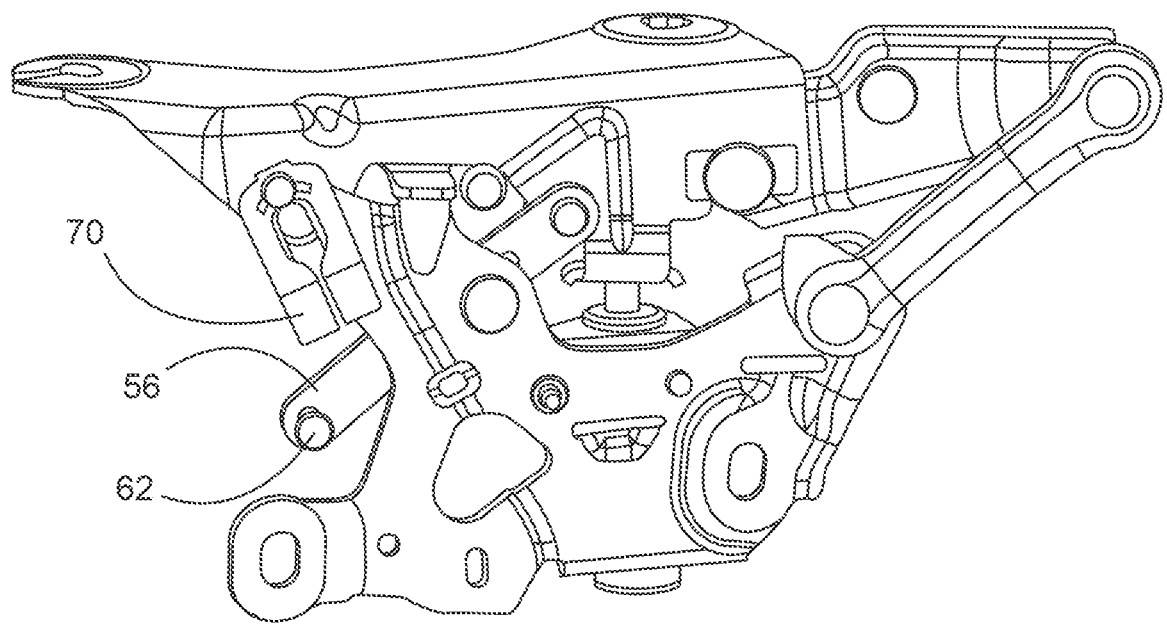
FIG. 15 is a perspective view of the hinge of FIG. 2 in a final deployed position following a hood collision.

As illustrated in FIG. 2, the hinge 12 comprises a first hinge portion 18 mounted to the body 14. A second hinge portion 20 is interconnected to the first hinge portion 18 by first and second linkages 22, 24, which each have opposing ends secured to the first and second hinge portions 18, 20 by linkage pins 26 that permit these elements to pivot relative to one another.

The second hinge portion 20 comprises first and second members 28, 30 that move in unison with one another during the normal hinge operating state. The first and second members 28, 30 are joined by a member pin 32 to permit rotation of the second member 30 relative to the first member 28 in response to a pedestrian collision input.

An actuator assembly 34 comprises an actuator 36 that is in communication with a controller 38. A sensor 40 detects information indicative of a pedestrian collision or impending pedestrian collision with the front of the vehicle and communicates this information to the controller 38. When the controller 38 determines it is desirable to partially raise the hood 16 from position P1 to position P3 to absorb a pedestrian impact, the actuator 36 is fired driving a portion of the actuator 36 upward to engage the second member 30, as indicated by arrow F.

Impact of the actuator 36 with the second member 30 causes a release assembly 42 to permit the second member 30 to rotate about the member pin 32 with respect to the first member 28. As the hood 16 moves towards position P3, a hold assembly 60 limits movement of the hood 16 to position P3 and then allows the hood to relax slightly to absorb the pedestrian impact.

Referring to FIGS. 2-12, the release assembly 42 comprises an opening or slot 44 provided in the second member 30. A retainer, which may take a number of forms, for example a latch (not illustrated) or a frangible clip 46, is mounted to the second member 30 and arranged within the opening or slot 44. A releasable pin 48 is affixed to the first member 28 and extends through an aperture in the clip 46. Since the release assembly does not limit movement of the hood 16, there is no need for opening 44 to be a slot with a terminal end to stop the releasable pin from movement past a certain point.

When the actuator 36 fires in response to the collision input, the second member 30 is driven upward, breaking the plastic clip 46 at frangible connections 54 that provide weakened regions. The releasable pin 48 is no longer constrained in the opening or slot 44 by the retainer or clip 46 in the opened hood collision position.

An alternative to the use of a frangible clip 44 is the use of a latch (not illustrated) triggered by the actuator 36 to release the releasable pin 48.

The hold assembly 60 is shown in more detail in FIGS. 6-14. In one example, the hold assembly 60 comprises a retention link 56 rotatably mounted at a first end 58 to the second member with a retention pin 62 located at second end 59. The retention link 56 further comprises a locating pin 64 between the first end 58 and the second end 59. The locating pin 64 is configured to ride in a curved slot 66 in the first member 28 during a collision event. The locating pin 64 moves in an arc in the curved slot 66 to facilitate a smooth and geometrically consistent motion of the retention link 56. The orientation of the retention link 56 in relation to the second member 30 changes as the second member 30 pivots about the member pin 32 in relation to the first member 28.

The first hinge portion 18 comprises a retention slot 68 with an open end into which the retention pin 62 is urged as the second member 30 rotates in relation to the first member 28. Typically, the retention slot 68 is relatively rigid. A flexible retention clip 70 is mounted adjacent the retention slot 68 opposite the direction of entry of the retention pin 62 into the retention slot 68. The retention clip is provided with an open portion 72 connected to an open-ended narrow channel 74.

In the embodiment illustrated, as the retention pin 62 enters the retention slot 68, the retention pin 62 contacts a rear face of the retention clip 70 and urges the retention clip 70 away from the retention slot 68 until the retention pin 62 travels close to the closed end of the retention slot 68. The retention slot 68 may be tapered to apply increasing resistance to the shaft of the retention pin 62 as the retention pin 62 travels from the open end of retention slot 68 towards its closed end. At a certain point, with the retention clip 70 biased away from the retention pin 62, the retention pin 62 encounters the open portion 72 of the retention clip 70 and passes through it. At this point during the hood collision event, the hood 16 is at its maximum angle P3 in relation to the vehicle body. The retention pin 62 may bounce off the closed end of the retention slot 68 but remain within the open portion 72 of the retention clip 70 to maintain the hood 16 within a range of motion as the pedestrian moves towards contact with the hood 16. This controlled deceleration is desirable to prevent violent "hood flutter" and increased pedestrian contact acceleration during the pedestrian impact event. Thus, it is desirable to push the hood up as quickly as possible and bring it to a relatively stable position as gently as possible—all within about 30 ms.

In order to reduce the shock to the pedestrian, it is beneficial to allow some refraction of the hood 16 as the head of the pedestrian contacts the hood 16. During a rebound phase, the head of the pedestrian bearing on the hood forces the retention pin 62 back out of the retention slot. A front face of the retention clip 70 now in contact with the retention pin 62 is configured to bias against the retention pin 62 as the retention pin 62 is urged from the open portion 72 into and through the open-ended narrow channel 74 of the retention clip 70. Optionally, the retention clip 70 may be angled between the section comprising the open portion 72 and the section comprising the open-ended narrow channel 74 to create elastic deformation and increasing resistance as the retention pin 62 moves progressively along the open-ended narrow channel 74. When the retention pin 62 exits the open-ended narrow channel 74, the hood is no longer resisted by the retention clip 70 and essentially floats.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A pedestrian protection automotive hinge comprising:
   a first hinge portion, a second hinge portion which comprises a first member and a second member that are secured to one another by a member pin, and wherein the first member or the second member has an opening adapted to releasably retain a releasable pin;
   a first linkage and a second linkage, spaced apart from one another and each pivotally interconnected to the first hinge portion and the first member, the first linkage and the second linkage, configured to permit movement of the first hinge portion and the second hinge portion relative to one another between a normal closed hood position and a normal opened hood position;
   an actuator assembly comprising an actuator configured to engage the second member and move the second member in relation to the first member in response to a collision input;
   a release assembly comprising a retainer located adjacent the opening, wherein the releasable pin is supported by the other of the first member or the second member and the releasable pin is captured in the opening by the retainer in the normally closed position and the normally opened position, and wherein the retainer is configured to release the releasable pin in response to the collision input permitting the second member to pivot about the member pin relative to the first member;
   a retention link rotatably mounted at a first end to the second member and comprising a retention pin adjacent a second end of the retention link and a locating pin between the first end and the second end;
   the locating pin configured to ride in a curved slot in the first member to change an orientation of the retention link in relation to the second member as the second member pivots about the member pin relative to the first member;
   the first hinge portion comprising a retention slot and a flexible retention clip mounted therewith, the retention clip comprising an open portion adjoining an open-ended narrow channel; and
   the retention pin configured to register with the retention slot and to bias the retention clip sufficiently to permit a portion of the retention pin to enter the open portion of the retention clip and thereby to reverse the biasing of the retention clip to permit the retention clip to again rest adjacent the retention slot whereby motion of the retention pin is resisted by the retention clip.

2. The pedestrian protection automotive hinge of claim 1, wherein the retention clip is further configured to permit the retention pin to enter the open-ended narrow channel when further force is applied by the retention pin against resistance of the retention clip until the retention pin exits an open end of the narrow channel to permit movement of the first and second members relative to one another to a final end-of-collision hood position.

3. The pedestrian protection automotive hinge of claim 1, wherein the retainer comprises one of a breakable clip and a latch.

4. The pedestrian protection automotive hinge of claim 1, wherein the retention slot is tapered.

5. A method of deploying a pedestrian protection automotive hinge, the method comprising the steps of:
providing a hinge comprising a first hinge portion and a second hinge portion which comprises a first member and a second member secured to one another by a member pin, and wherein the first member or the second member has an opening adapted to releasably retain a releasable pin;
wherein a first linkage and a second linkage, spaced apart from one another are each pivotally interconnected to the first hinge portion and the first member and the first and second linkages are configured to permit movement of the first and second hinge portions relative to one another between a normal closed hood position and a normal opened hood position;
activating an actuator in response to a collision input to engage the second member and move the second member in relation to the first member;
releasing a releasable pin from a retainer of a release assembly and from the opening in response to the collision input to permit the second member to pivot about the member pin relative to the first member;
moving a locating pin located between a first end and a second end of a retention link in a curved slot in the first member to change an orientation of the retention link rotatably mounted at the first end to the second member as the second member pivots about the member pin relative to the first member;
registering a retention pin with a retention slot;
biasing a retention clip sufficiently to permit a portion of the retention pin to enter an open portion of the retention clip; and
resisting motion of the retention pin via the retention clip.

6. The method of claim 5, further comprising permitting the retention pin to enter an open ended narrow channel in the retention clip when further force is applied by the retention pin against resistance of the retention clip until the retention pin exits the open end of the narrow channel to permit movement of the first member and the second member relative to one another to a final end-of-collision hood position.

7. A method of deploying a pedestrian protection automotive hinge,
wherein the pedestrian protection automotive hinge comprises:
a first hinge portion, a second hinge portion which comprises a first member and a second member that are secured to one another by a member pin, and wherein the first member or the second member has an opening adapted to releasably retain a releasable pin;
a first linkage and a second linkage, spaced apart from one another and each pivotally interconnected to the first hinge portion and the first member, the first linkage and the second linkage, configured to permit movement of the first hinge portion and the second hinge portion relative to one another between a normal closed hood position and a normal opened hood position;
an actuator assembly comprising an actuator configured to engage the second member and move the second member in relation to the first member in response to a collision input;
a release assembly comprising a retainer located adjacent the opening, wherein the releasable pin is supported by the other of the first member or the second member and the releasable pin is captured in the opening by the retainer in the normally closed position and the normally opened position, and wherein the retainer is configured to release the releasable pin in response to the collision input permitting the second member to pivot about the member pin relative to the first member;
a retention link rotatably mounted at a first end to the second member and comprising a retention pin adjacent a second end of the retention link and a locating pin between the first end and the second end;
the locating pin configured to ride in a curved slot in the first member to change an orientation of the retention link in relation to the second member as the second member pivots about the member pin relative to the first member;
the first hinge portion comprising a retention slot and a flexible retention clip mounted therewith, the retention clip comprising an open portion adjoining an open-ended narrow channel;
the retention pin configured to register with the retention slot and to bias the retention clip sufficiently to permit a portion of the retention pin to enter the open portion of the retention clip and thereby to reverse the biasing of the retention clip to permit the retention clip to again rest adjacent the retention slot whereby motion of the retention pin is resisted by the retention clip,
steps of the method comprising:
activating an actuator in response to a collision input to drive a vehicle hood upward;
releasing a releasable pin from a retainer in response to the actuator to allow a second member to pivot relative to a first member about a member pin;
engaging a retention pin in a retention slot to restrain motion of the second member; and
restraining the vehicle hood from further deflection in an opened hood collision position pending contact with a head of a pedestrian.

8. The method according to claim 7, comprising a step of engaging the second member with the actuator to initiate the releasing step.

9. The method according to claim 7, comprising a step of releasing the releasable pin using one of a breakable clip and a latch.

10. The method according to claim 7, further comprising a step of providing the retention slot that is tapered to assist in deceleration of the vehicle hood.

11. A method of deploying a pedestrian protection automotive hinge, the method including steps comprising:
activating an actuator in response to a collision input to drive a vehicle hood upward;
engaging a retention pin in a retention slot while pivoting a second member relative to a first member about a member pin; and
allowing the vehicle hood to rebound to a final opened hood collision position by engaging the retention pin in a retention clip and translating the retention pin through and out of the retention clip.

12. A vehicle, comprising a pedestrian protection automotive hinge comprising:
a hinge coupled to the vehicle, wherein the hinge comprises:
a first hinge portion, a second hinge portion which comprises a first member and a second member that are secured to one another by a member pin, and wherein the first member or the second member has an opening adapted to releasably retain a releasable pin;

a first linkage and a second linkage, spaced apart from one another and each pivotally interconnected to the first hinge portion and the first member, the first linkage and the second linkage, configured to permit movement of the first hinge portion and the second hinge portion relative to one another between a normal closed hood position and a normal opened hood position;

an actuator assembly comprising an actuator configured to engage the second member and move the second member in relation to the first member in response to a collision input;

a release assembly comprising a retainer located adjacent the opening, wherein the releasable pin is supported by the other of the first member or the second member and the releasable pin is captured in the opening by the retainer in the normally closed position and the normally opened position, and wherein the retainer is configured to release the releasable pin in response to the collision input permitting the second member to pivot about the member pin relative to the first member;

a retention link rotatably mounted at a first end to the second member and comprising a retention pin adjacent a second end of the retention link and a locating pin between the first end and the second end;

the locating pin configured to ride in a curved slot in the first member to change an orientation of the retention link in relation to the second member as the second member pivots about the member pin relative to the first member;

the first hinge portion comprising a retention slot and a flexible retention clip mounted therewith, the retention clip comprising an open portion adjoining an open-ended narrow channel; and the retention pin configured to register with the retention slot and to bias the retention clip sufficiently to permit a portion of the retention pin to enter the open portion of the retention clip and thereby to reverse the biasing of the retention clip to permit the retention clip to again rest adjacent the retention slot whereby motion of the retention pin is resisted by the retention clip.

13. The vehicle according to claim 12, further comprising:
a sensor, configured to detect information indicative of a pedestrian collision and to communicate the information via a controller to the actuator of the actuator assembly of the pedestrian protection automotive hinge.

14. A method for using a pedestrian protection automotive hinge, wherein the pedestrian protection automotive hinge comprises:

a first hinge portion, a second hinge portion which comprises a first member and a second member that are secured to one another by a member pin, and wherein the first member or the second member has an opening adapted to releasably retain a releasable pin;

a first linkage and a second linkage, spaced apart from one another and each pivotally interconnected to the first hinge portion and the first member, the first linkage and the second linkage, configured to permit movement of the first hinge portion and the second hinge portion relative to one another between a normal closed hood position and a normal opened hood position;

an actuator assembly comprising an actuator configured to engage the second member and move the second member in relation to the first member in response to a collision input;

a release assembly comprising a retainer located adjacent the opening, wherein the releasable pin is supported by the other of the first member or the second member and the releasable pin is captured in the opening by the retainer in the normally closed position and the normally opened position, and wherein the retainer is configured to release the releasable pin in response to the collision input permitting the second member to pivot about the member pin relative to the first member;

a retention link rotatably mounted at a first end to the second member and comprising a retention pin adjacent a second end of the retention link and a locating pin between the first end and the second end;

the locating pin configured to ride in a curved slot in the first member to change an orientation of the retention link in relation to the second member as the second member pivots about the member pin relative to the first member;

the first hinge portion comprising a retention slot and a flexible retention clip mounted therewith, the retention clip comprising an open portion adjoining an open-ended narrow channel;

the retention pin configured to register with the retention slot and to bias the retention clip sufficiently to permit a portion of the retention pin to enter the open portion of the retention clip and thereby to reverse the biasing of the retention clip to permit the retention clip to again rest adjacent the retention slot whereby motion of the retention pin is resisted by the retention clip, the method comprising:
absorbing a pedestrian impact and providing pedestrian protection during a pedestrian collision of a vehicle.

* * * * *